PUMP PRIMING AND FLOW CONTROL VALVE FOR PUMPING TWO DIFFERENT FLUIDS

Original Filed Jan. 27, 1971

PAUL H. REEVE

BY

Ostrolenk, Faber, Gerb & Soffen

ATTORNEYS

United States Patent

Re. 28,428
Reissued May 27, 1975

28,428

PUMP PRIMING AND FLOW CONTROL VALVE FOR PUMPING TWO DIFFERENT FLUIDS

Paul H. Reeve, River Vale, N.J., by Auto Research Corporation, Rochelle Park, N.J., assignee Original No. 3,671,148, dated June 20, 1972, Ser. No. 110,024, Jan. 27, 1971. Application for reissue Dec. 19, 1973, Ser. No. 426,230
Int. Cl. F04b *49/00*
U.S. Cl. 417—295 11 Claims

Matter enclosed in heavy brackets [ ] appears in the original patent but forms no part of this reissue specification; matter printed in italics indicates the additions made by reissue

ABSTRACT OF THE DISCLOSURE

In a pump for pumping fluids of differing viscosities, a valve element which is shiftable to both block and regulate the flow of the fluid of lower viscosity; the valve normally blocks the flow of lower viscosity fluid until the pump is primed; outlet pressure from the pump, which is developed only when the pump is primed, moves the valve away from the blocking position, against a biasing means, to open the conduit of lower viscosity fluid; the biasing means controls the extent to which the valve is opened, and thereby regulates the ratio of low viscosity to high viscosity fluid that is pumped.

Figure 1:
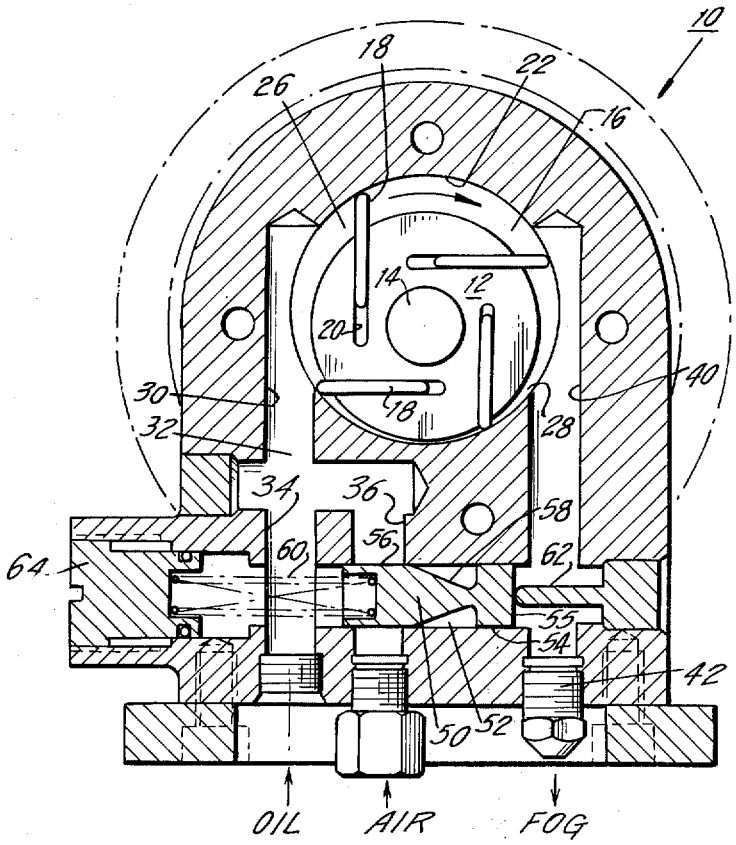

The present invention generally relates to pumps for pumping two fluids of differing viscosities, and more particularly to pumps for pumping a gas and a liquid like air and lubricant oil. The pump has particular application in connection with the production of a lubricant fog.

Priming a pump for pumping two fluids of differing viscosities is difficult. The seals on the moving parts of the pump must be sufficiently loose so that when the pump has been primed, the higher viscosity fluid does not cause the pump elements to so adhere to each other that pump operation is hindered. But, while the pump is being primed and before the higher viscosity fluid has completed the seal of the pump, the loose seals permit escape of the lower viscosity fluid from the pump chamber. This leakage prevents full pumping pressure from being developed in the pump to draw the higher viscosity fluid into the pump and thereby slows the priming of the pump.

Furthermore, where the lower viscosity fluid is a compressible gas, as occurs in the preferred application of the present invention, the initial pumping operation of the pump can be largely satisfied by the compressible gas itself. On the pump inlet side, the gas expands and fills the inlet chamber, creating little suction to draw in the higher viscosity liquid.

Even where the relative quantities of high and low viscosity fluids, which can be drawn into the pump, are regulated, however, priming takes a long time because of the above described leakage of the low viscosity fluid past the pump seals and because the pump operation, is in good part, satisfied by the lower viscosity fluid.

Even after the pump has been primed, the relative flow rates of the lower and higher viscosity fluids, must be regulated or else the pump operation will be satisfied from the more easily pumped lower viscosity fluid.

Conventionally, relative flow rate control during both priming and regular pump operation is through the use of a Venturi mixing nozzle, as is shown, for example, in U.S. Pat. No. 2,691,428, issued on Oct. 12, 1954 to T. R. Thomas, and assigned to the assignee hereof. The flow of lower viscosity fluid draws along the higher viscosity fluid, and both are carried into the pump. The present invention, as shown below, eliminates the need for a Venturi valve.

To vary the output of a prior art pump, its outlet nozzle might be changed. Different applications might require different numbers of outlet nozzles. Each change in the capacity of an outlet nozzle or in the number of outlet nozzles results in a change in the relative quantity of high viscosity fluid that must be pumped to satisfy the pump output requirements, and a change in the resistance to the flow of pumped material, in particular to the flow of the lower viscosity fluid, e.g. gas or air. An increase in the resistance to the flow of material at the outlet increases the pressure drop between the pump and the outside and increases the relative flow of lower viscosity fluid and the relative quantity of that material that is drawn into the pump. Adjustments have to be made to properly balance the fluids entering the pump. This may require substituting a different Venturi nozzle with different flow rate characteristics and/or providing various types of flow restriction means in one or both of the higher and lower viscosity material inflow conduits leading to the Venturi nozzle.

Each application of a pump would require a particular Venturi nozzle and flow restriction means and would require considerable adjustments in these elements to bring about the desired pumping output. A substantial inventory of Venturi nozzles and flow restriction means would be required.

The present invention improves upon the prior art by providing a priming assistance and flow rate controlling valve in the inlet pathway of the lower viscosity fluid. A biasing means normally biases the valve to prevent the entry before priming or restrict the entry after priming of lower viscosity fluid. The valve communicates with the outlet pressure from the pumping means. By adjustment of the biasing means, the movement of the valve under the pressure exerted in the outlet conduit is balanced for desired pump operation.

The valve is so shaped and positioned that in its initial position before the pump is primed, the biasing means holds the valve where it substantially completely blocks the entrance of lower viscosity fluid into the pumping chamber. When the pump operates, it only draws the higher viscosity fluid through the pump, rapidly sealing the pump, and priming it.

Where, as in the preferred application of the present invention, the higher viscosity fluid is a liquid, e.g. lubricating oil, the pump is being primed with an incompressible and inexpansible fluid. Therefore, the displacement caused by the expanding and contracting pumping chambers is filled with and causes pumping of liquid, and the priming is completed rapidly.

Once higher viscosity fluid has been pumped to the outlet nozzle of the pump, the outlet pressure of the unit rises and operates on the valve to move it away from blocking the lesser viscosity fluid inlet against the force of the biasing means. The valve is so shaped that as it is shifted by the outlet pressure, it gradually widens the inlet opening leading from the supply of lower viscosity fluid and permits a greater relative quantity of this fluid to be pumped. The now primed pump pumps both the lower and the higher viscosity fluids. By simply adjusting the force exerted by the biasing means, the extent to which the valve shifts due to the pressure developed in the outlet conduit from the pump is varied, and the relative rates of flow of lower and greater viscosity fluids are controlled.

In the preferred lubricant fog pump application for the present invention, this simple adjustment to the force of the biasing means adjusts the quantity of liquid droplets in and the density of the fog produced.

Unlike prior art pumps, Venturi nozzles or the like means are not required to control the quantity of high viscosity fluid which is pumped.

The present invention also permits temporary adjustments in the pumping apparatus while it is continuing to operate, without requiring replacement of parts or halting of the pumping. Should a greater quantity of high viscosity fluid be temporarily required, e.g. in a fog pump application more liquid lubricant might be required to lubricate a bearing that is becoming overheated, adjustment of the biasing means to readjust the position of the valve varies the relative quantities of high and low viscosity fluids being pumped. For example, the ratio of lubricant fog to the liquid oil, which has either not entered or has condensed from fog form, exiting from the outlet nozzle can be adjusted to provide a greater quantity of the liquid to cool the overheated bearing. Later readjustment back to the prior operating mode is easy.

There are other applications involving a structure having the same problems. For example, an air compressor, which pumps only air, may require a liquid to lubricate its engaging surfaces but the liquid should not be pumped through the unit.

If the invention is used with an air compressor where limited liquid or, after the compressor is primed, no liquid is needed for lubricating the engaging parts of the compressor, the valve may be designed so that as it shifts when the pump is primed, it blocks completely or partially the inflow of liquid, thereby ensuring that only enough liquid to lubricate the compressor itself is provided.

Accordingly, it is a primary object of the present invention to provide an improved pumping means for simultaneously pumping a plurality of fluids of different viscosities.

It is another object of the invention to provide such a pumping means, which can be readily primed.

It is a further object of the invention to provide such a pumping means in which the relative flow rates of the high and low viscosity fluids can be readily adjusted.

It is yet another object of the invention to provide such a pumping means, which does not require Venturi nozzles or the like for controlling the relative flow rates of high and low viscosity fluid through the pumping means.

It is a further object of the invention to provide such a pump, which can be readily adjusted for use in various applications having different output requirements.

Figure 2:
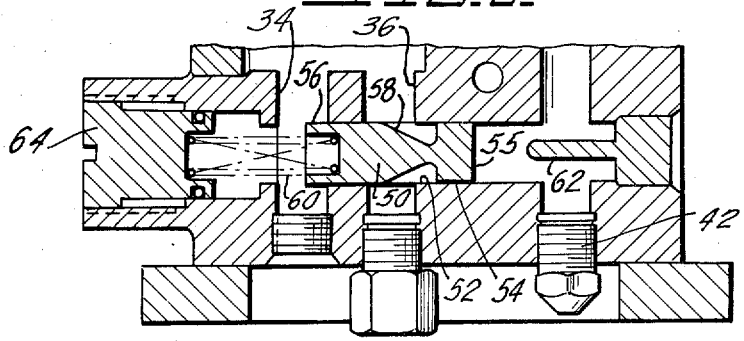

These and other objects of the present invention will become apparent from the following description of the accompanying drawings in which:

FIG. 1 is a cross-sectional view of a pumping means incorporating the present invention; and FIG. 2 is a fragmentary view of the pumping means of FIG. 1 showing the invention in operation.

Referring to the drawings, the present invention is described in connection with a vane pump 10 used in pumping relatively low viscosity air and relatively high viscosity lubricant oil so as to generate a lubricant fog. The present invention is adaptable for use with other types of pumps and in connection with other high and low viscosity fluids.

Such a vane pump is shown, for example, in aforementioned U.S. Pat. No. 2,691,428. A vane pump is comprised of a cylindrical pump element 12, which is rotated concentrically about its axis 14. The axis is eccentrically located within pump chamber 16. A plurality of vanes 18 reciprocate into and out of respective vane slots 20 in pump element 12 and are held against wall 22 surrounding pump chamber 16.

The vanes divide main pump chamber 16 into a number of pumping chambers, e.g. 26, which is the expanding intake chamber, and 28, which is the contracting expulsion chamber. As pump element 12 rotates, each chamber between each pair of vanes also rotates and moves from being an intake chamber 26 to an expulsion chamber 28, thereby carrying the materials to be pumped to the outlet of the pump.

The housing of pump 10 includes a number of bores therethrough, which serve as the pump conduits and guideways, as described below. As element 12 rotates, each intake chamber 26 of the pump communicates with conduit 30. This conduit extends from conduit junction 32.

Junction 32 joins oil inlet conduit 34 and air inlet conduit 36 to produce a combined air-oil flow. Inlet conduit 34 is connected with an appropriate reservoir (not shown) of oil. Inlet conduit 36 communicates with a supply of gas or air, or, most usually, with the ambient atmosphere.

Each expulsion chamber 28 communicates with the outlet conduit 40, which leads to the conventional outlet fog nozzle means 42. The pumped fog and liquid oil exits from nozzle means 42. As noted above, any size nozzle or number of nozzles may be chosen in accordance with the particular application for the pump means of the invention.

The present invention relates to a means for controlling the flow of air through conduit 36 into junction 32. By controlling the flow of air, the pump can be primed and the relative flow rates of air and oil can be regulated.

A pump priming assistance and flow rate controlling valve 50 is positioned in and is moved through a guideway conduit 52. At one end, conduit 52 communicates with outlet conduit 40. Guideway 52 extends away from conduit 40 a distance sufficient to permit valve 50 to shift through its entire course. Guideway 52 has a circular cross-section and valve 50 is of a spool type, which has a corresponding circular cross-section.

Air inlet conduit 36 intersects guideway conduit 52, and conduit 36 may be partially or completely blocked by valve 50 as it moves through guideway 52, in the manner described below.

Valve 50 includes a widened end cap 54, which orients and guides the valve movement. Cap 54 seals guideway 52 and provides a surface 55 against which the outlet pressure in conduit 40 can operate, as described below.

At the end opposite cap 54, valve 50 includes air inlet conduit blocking section 56, the length and diameter of which is such that it can completely block off the flow of air through conduit 36 when section 56 is moved into a position where it can extend across inlet conduit 36.

End cap 54 and valve section 56 are joined by gradually tapering, intermediately located flow regulating valve section 58. As valve 50 is shifted from the position in FIG. 1, where valve section 56 completely blocks conduit 56, to the left toward its position of FIG. 2, the tapering of surface 58 gradually increases the cross-sectional area of the opening through conduit 36, thereby increasing the quantity of air, which will be permitted through the conduit. For a predetermined quantity of liquid oil, the flow rate of air to be mixed with the oil is varied.

Biasing means 60 operates on the left hand end of valve 50 to force same toward outlet conduit 40. The valve shifts to the right to its position in FIG. 1 until is end cap 54 abuts positioning and abutment post 62, which is supported in position within the pump housing. Post 62 is narrowed so as not to interfere with the transmission of pressure from conduit 40 against the end of cap 54.

When cap 54 of valve 50 is abutting post 62 under the influence of spring 60, section 55 is completely blocking inlet conduit 36. The condition illustrated in FIG. 1 exists only before the pump has been primed. When the pump initiates operation in this condition, since all air flow is blocked by valve section 56, the full displacement of the pump must be satisfied out of oil inlet line 34. Oil is the only material pumped out of outlet conduit 40 and nozzle 42.

The flow resistance of nozzle 42 and any other flow resisting means interposed in the outlet from the pump elevates the pressure in outlet conduit 40. This pressure operates against surface 55 of valve 50. The valve is shifted to the left in FIG. 1 toward the position of FIG. 2 against spring 60. This opens air conduit 36.

Valve 50 will continue to shift to the left admitting a greater quantity of air in relation of the quantity of oil being pumped until spring 60 is sufficiently compressed to halt the movement of the valve. The forces on valve 50 are then in equilibrium.

In order to control the relative rates of flow of air and oil, the compression of spring 60 is adjusted by tightening of threaded adjustment means 64 against which one end of biasing means 60 presses. Depending upon the number or type of outlet nozzle means 42 which are employed, depending on the quantity of liquid oil to be pumped as compared with the quantity of fog, depending upon the viscosity of the oil to be pumped, which will vary as a result of the ambient temperature and the operating temperature of the pump over prolonged use, and depending upon other factors, a simple adjustment of adjusting means 64 will vary the relative quantities of air and liquid oil that are pumped through the pump to provide optimum fog and/or liquid output.

Regardless of how adjustment means 64 is adjusted, valve 50 will continue to serve as an efficient priming assistance means because when there is no output pressure in conduit 40, which would occur before the pump is primed, the force of biasing means 60 is sufficient to move valve 50 over against abutment post 62 and block inlet conduit 36.

If the invention is used in conjunction with an air compressor where, after priming, only a very limited quantity of liquid or no liquid at all should enter chamber 16, conduit 34 would be so positioned and valve 50 would be so placed that on shifting to the left in FIG. 1, valve 50 would partially or completely block the liquid conduit 34, thereby controlling liquid flow.

There has just been described a novel valve for assisting in the priming of a pump and for assisting in the flow rate control of a pump, which simultaneously pumps fluid of differing viscosities. The invention utilizes a valve which is shaped so as to block the low viscosity fluid inlet line until the pump is primed, thereby to speed pump priming. The valve then shifts to open the low viscosity fluid line under the influence of the pressure at the outlet from the pump.

Adjustment means are provided to control the extent to which the valve opens to permit low viscosity fluid to enter the pump, whereby the relative flow rates of high and low viscosity fluids are readily controlled.

Although this invention has been described with respect to its preferred embodiments, it should be understood that many variations and modifications will now be obvious to those skilled in the art and, therefore, it is preferred that the invention be limited not by the specific disclosure herein but only by the appended claims.

I claim:

[1. In a pump for simultaneously pumping fluids of differing viscosities, said pump comprising:

a first inlet conduit for a fluid of a relatively lower viscosity; a second inlet conduit for a fluid of a relatively higher viscosity; a junction between said first and said second conduits; pumping means communicating with said junction for pumping the fluids to an outlet conduit; and an outlet conduit from said pumping means;

the improvement comprising, a pump priming assistance valve positioned to be moved into and out of the path of flow through said first conduit for alternately blocking and permitting flow therethrough to said junction; said valve communicating with said outlet conduit to be shifted in a direction which opens said first conduit when pressure in said outlet conduit acts upon said valve;

a biasing means connected with said valve for biasing same in a direction which causes said valve to block said first conduit.]

2. In the pump of claim [1] *14*, the improvement further comprising, said valve being so shaped and positioned that before pressure builds up in said outlet conduit, said valve is held to completely block flow through said first conduit toward said junction.

3. In the pump of claim [1] *14*, the improvement further comprising, said valve further serving as a pump flow rate controlling valve; said valve being so shaped and positioned that a shifting thereof in one direction gradually increasingly opens said first conduit to cause flow therethrough at a greater rate, and movement of said valve in the other direction gradually closes said first conduit to cause flow therethrough at a lesser rate;

said biasing means operating upon said valve to be balanced against the pressure in said outlet conduit, thereby to regulate the flow through said first conduit.

4. In the pump of claim 3, the improvement further comprising, apparatus for adjusting the biasing force exerted by said biasing means upon said valve against the pressure in said outlet conduit.

5. The pump of claim 3, wherein said pumping means is a rotary vane type pump and said junction is upstream of said vane pump.

6. The pump of claim 3, wherein the fluid of lesser viscosity is a gas and the fluid of greater viscosity is a liquid.

7. The pump of claim 6, wherein said pumping means is of a type to produce a fog of liquid droplets, which droplets are carried by the gas pumped by said pump.

8. The pump of claim 7, wherein the liquid is a lubricant oil.

[9. In the pump of claim 3, the improvement further comprising, a guideway for controlling the path of movement of said valve; said outlet conduit being so connected with said guideway as to drive said valve toward said biasing means; said biasing means being so designed as to have its biasing force on said valve increased as said valve is moved toward it.]

[10. In the pump of claim 9, the improvement further comprising, apparatus for adjusting the biasing force exerted by said biasing means upon said valve.]

11. In the pump of claim [9] *3*, the improvement further comprising, said valve having, for the purpose of regulating the rate of flow of lesser viscosity fluid through said first conduit, a tapering shaped section with the narrower end of said tapering section facing toward said outlet [outlet] conduit and the wider end thereof facing toward said biasing means.

12. In the pump of claim 11, the improvement further comprising, said valve having a portion, at the end thereof facing toward said biasing means, which is of sufficient width so as to completely block said first conduit.

13. In the pump of claim 2, the improvement further comprising, said valve being so positioned with respect to said second inlet conduit and being so shaped with respect thereto that when said valve shifts against said biasing means and opens said first conduit, said valve also moves to block said second conduit, thereby limiting the quantity of higher viscosity fluid in said pump.

*14. A pump for simultaneously pumping fluids of differing viscosities, said pump comprising,*

*a first inlet conduit for a fluid of a relatively lower viscosity; a second inlet conduit for a fluid of a relatively higher viscosity; a junction between said first and second inlet conduits;*

*pumping means communicating with said junction for pumping the fluids therefrom; an outlet conduit from said pumping means for pumping the fluids to a point of use;*

*a fluid-flow control valve including a movable valve-member for controlling the flow through said first conduit to said junction; a guideway in said pump for controlling the path of movement of said valve member; said first conduit intersecting said guideway at a location such that said valve member moves across said first conduit;*

*said valve member having one position in said guideway at which it blocks flow through said first conduit and said valve member being so shaped as to block flow through said first conduit when it is at said one position;*

*biasing means connected with said valve member for*

*biasing same, in opposition to the pressure in said outlet conduit, to move in said guideway in a direction toward the said one position to thus cause said valve member to block flow through said first conduit when pressure in said outlet conduit is non-existent;*

*said outlet conduit communicating with said guideway in a manner such that the pressure developed in said outlet conduit by operation of said pumping means is transmitted to said valve member, which is thereby moved by said pressure from its said one position to another position in which said valve member permits flow through said first conduit;*

*said biasing means being so designed as to have its biasing force on said valve member increased as said valve member is moved toward said biasing means under the influence of pressure in said outlet conduit.*

References Cited

The following references, cited by the Examiner, are of record in the patented file of this patent or the original patent.

UNITED STATES PATENTS

| | | | |
|---|---|---|---|
| 2,918,009 | 12/1959 | Crevoisier | 418—15 |
| 2,699,727 | 1/1955 | Getz et al. | 418—15 X |

FOREIGN PATENTS

| | | |
|---|---|---|
| 740,672 | 11/1955 | Great Britain. |
| 1,108,994 | 6/1961 | Germany. |

C. J. HUSAR, Primary Examiner

G. P. LAPOINTE, Assistant Examiner

U.S. Cl. X.R.

137—100; 184—6.26, 56A; 239—415; 418—100